Feb. 16, 1960  N. KOPPINGER  2,924,826
APPARATUS FOR FORMING AND APPLYING HOG RING CONNECTORS
Filed Sept. 21, 1956  3 Sheets-Sheet 2
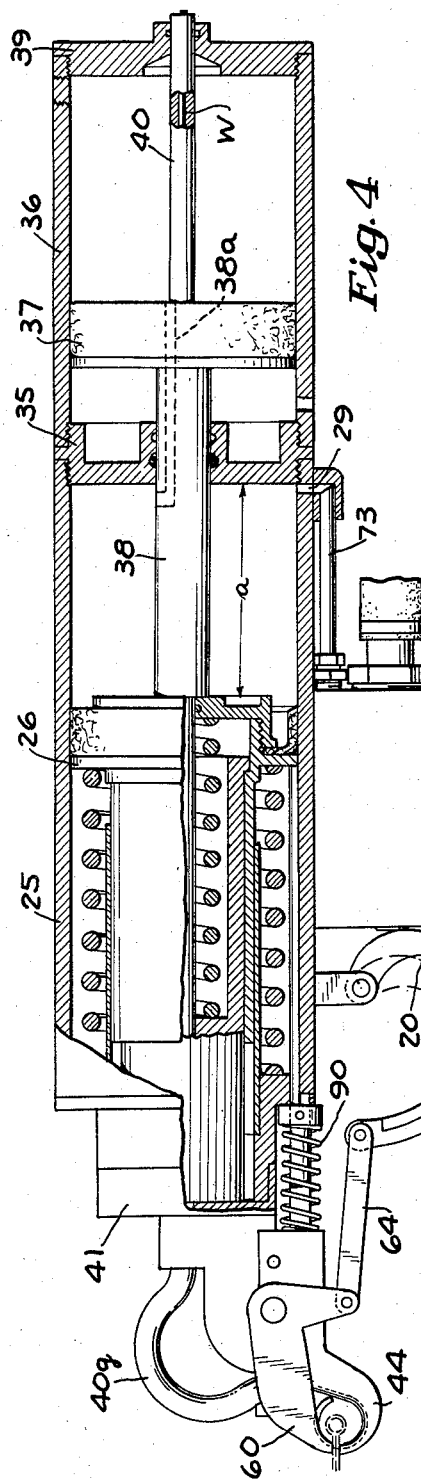
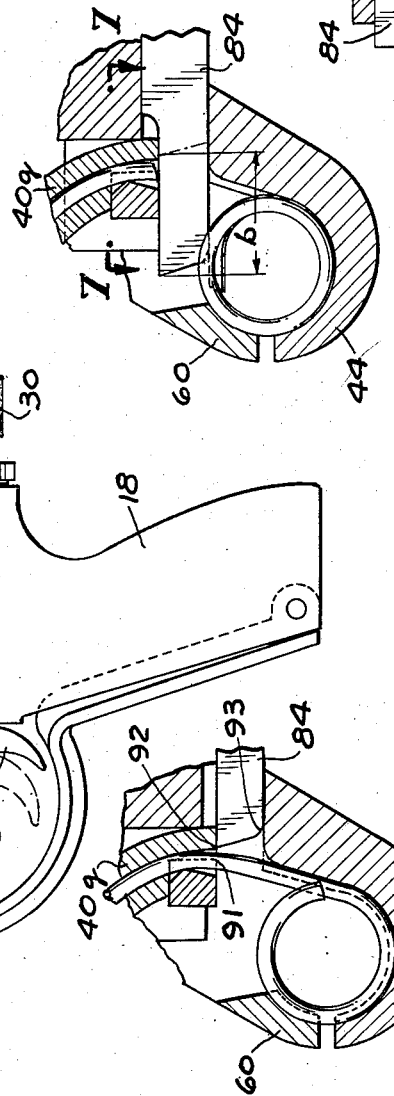
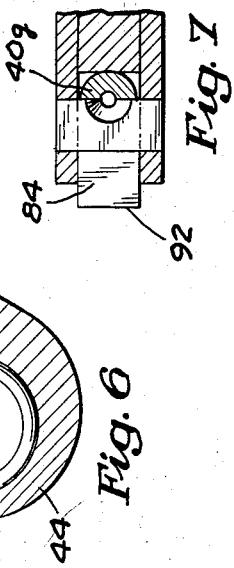
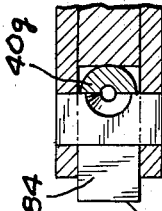
INVENTOR.
NICHOLAS KOPPINGER
BY
ATTORNEY Feb. 16, 1960 N. KOPPINGER 2,924,826
APPARATUS FOR FORMING AND APPLYING HOG RING CONNECTORS
Filed Sept. 21, 1956 3 Sheets-Sheet 3

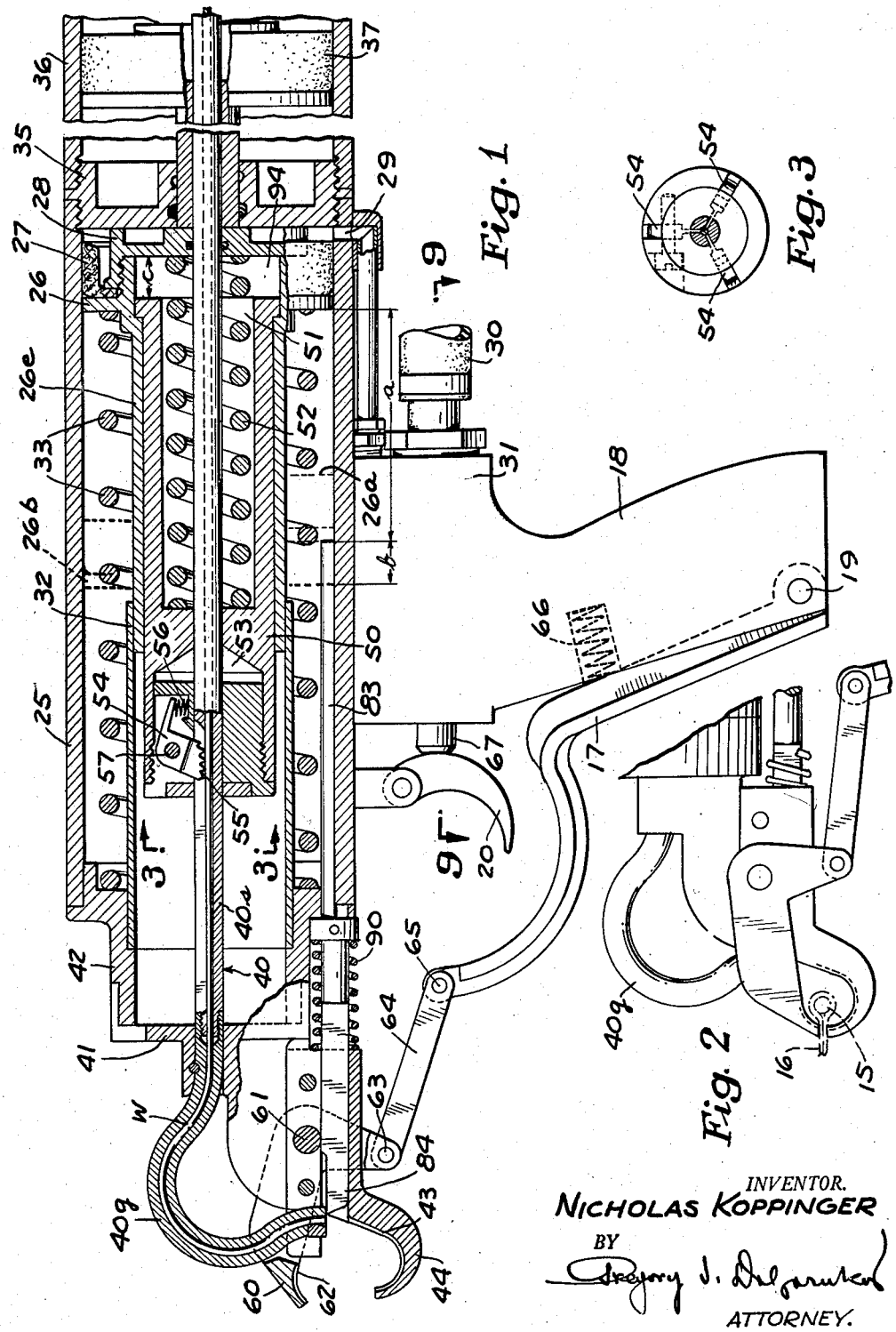
Feb. 16, 1960   N. KOPPINGER   2,924,826
APPARATUS FOR FORMING AND APPLYING HOG RING CONNECTORS
Filed Sept. 21, 1956   3 Sheets-Sheet 1
INVENTOR.
NICHOLAS KOPPINGER
BY
ATTORNEY.

INVENTOR.
NICHOLAS KOPPINGER
BY
ATTORNEY.

2,924,826

APPARATUS FOR FORMING AND APPLYING HOG RING CONNECTORS

Nicholas Koppinger, St. Clair Shores, Mich.

Application September 21, 1956, Serial No. 611,105

3 Claims. (Cl. 1—177)

This invention relates to a novel apparatus for use in upholstering operations and adapted for simultaneous forming and applying of upholstering wire rings usually referred to in the art as "hog rings."

Within the last several years use in the art of upholstering of sewing, nailing and similar operations has been replaced in many instances by application of the so-called "hog rings," which expedient has proved to be uncomparably faster, as well as more reliable and economical. An upholstering "hog ring" is a wire ring made of relatively hard wire, such as cold drawn wire, with its ends cut on a bias to provide sharp ends. The ring is usually approximately ½" in diameter, and is partially opened.

One of the objects of the present invention is to provide an improved apparatus whereby hog rings are produced from continuous strand of wire in the process of their application, thereby eliminating the necessity of producing and preforming such rings on special wire forming machines and in separate plants.

Another object of the present invention is to provide an improved apparatus whereby a hog ring is produced in the process of its application to the upholstered structure and whereby the operation of its preforming into a partially closed state is completely eliminated.

A further object of the present invention is to provide an improved apparatus of a hand tool type which, in spite of its light weight and manual manipulation, is capable of forming hog rings as rapidly as they can be applied, thereby eliminating the hand operations required for picking up individual hog rings and placing them into hand pliers.

A still further object of the present invention is to provide an improved apparatus for simultaneous forming and applying upholstering hog rings, which apparatus is power operated, whereby the manual effort required for closing the ring on the upholstered structure is eliminated.

A still further object of the present invention is to provide an improved apparatus of the foregoing character with the aid of which upholstering hog rings are produced directly at the place of application from a roll of suitable wire and exactly in the same quantity as they are required, whereby the necessity of having in stock a considerable quantity of hog rings, which are more expensive than wire, is eliminated.

A still further object of the present invention is to provide an improved apparatus whereby upholstering operations are greatly facilitated, are made easier, less time-consuming and less expensive.

A still further object of the present invention is to provide an apparatus of the foregoing nature which is small and compact, is simple and rugged in construction, is dependable in operation, relatively inexpensive to manufacture, and is usable with equal success both in automobile plants for high quantity production of original equipment as well as in small repair shops.

Further objects and advantages of this invention will be apparent from the following description and appended claims, reference being had to the accompanying drawings forming a part of this specification, wherein like reference characters designate corresponding parts in the several views.

Fig. 1 is a view, partially in section, illustrating my improved apparatus, the section being taken along the longitudinal axis of the operating cylinder of the device to show the parts of the device in their position at the beginning of the operative cycle, the jaws of the pincers being shown open and ready for application.

Fig. 2 is a fragmentary view showing the pincer jaws of the device separately, said jaws being shown closed around the upholstered structure.

Fig. 3 is a fragmentary sectional view taken in the direction of the arrows on the section plane passing through the line 3—3 of Fig. 1.

Fig. 4 is a view similar in part to Fig. 1 and showing the parts of the device after the wire is curled into a ring but before the cutting off operation begins.

Fig. 5 illustrates the pincer jaws and the cutting-off means just before cutting takes place.

Fig. 6 is a view similar in part to Fig. 5 but showing the parts of the device and a hog ring itself after the cutting-off operation has been completed and before the cutting-off means begin their return movement to their original position.

Fig. 7 is a sectional view, with the section being taken on the section plane passing through the section line 7—7 of Fig. 6.

It is to be understood that the invention is not limited in its application to the details of construction and arrangement of parts illustrated in the accompanying drawings, since the invention is capable of other embodiments and of being practiced or carried out in various ways. Also, it is to be understood that the phraseology and terminology employed herein is for the purpose of description and not of limitation.

In accordance with the invention, I discard the former practice of using hog rings in a preformed state and intended to be closed on the upholstered structure with the aid of a hand tool such as special pliers. In accordance with the invention, I provide a portable and hand manipulated tool which is power operated and which is adapted simultaneously to form and to apply hog rings, thus eliminating all of the disadvantages explained above.

When the workpieces are light, a device constructed in accordance with the present invention may be fixed in place or made in the form of a stationary device.

Figure 12:
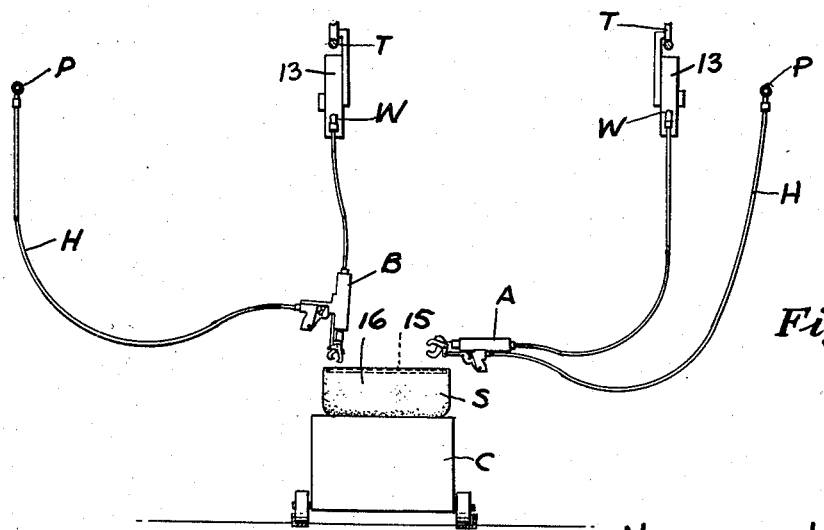
Fig. 12 is an elevational view illustrating one installation including two of my improved devices, one on each side of a conveyor carrying automobile cushions for performance of upholstery operations thereon.

Referring to the drawings, there is shown therein, by way of example, a pneumatic device embodying the present invention and adapted simultaneously to form and to apply upholstering hog rings to the place of their final application, such as to an automobile cushion. Fig. 12 illustrates an installation including a conveyor generally designated by the letter C, which conveyor carries automobile seat cushions in an upside down position.

As shown in Fig. 12, there are provided two posts, one on each side of the conveyor C, for operating on the cushion. The righthand post includes the device A adapted for convenient application in a horizontal position, while the lefthand post includes a similar device B particularly adapted for application in a vertical, downwardly directed position. Each device is connected to a spool 13 of wire W, the spool being supported on an overhead track T and adapted to supply the wire to the respective device. Air hose H connects each device to an air line designated by the letter P.

Figure 8:
Fig. 8 shows one hog ring after the same is formed.

In use the operator of each device holds the same in his hands and applies the pincer jaws to clasp the parts of the upholstery structure to be connected, such as the wire frame 15 and upholstery cloth 16 around the same, see Figs. 12 and 2. By pressing the grip 17 hinged on the revolver type handle 18 of the device as at 19 (see Fig. 2), the operator closes the pincer jaws on the upholstered structure. Thereupon, by pressing the trigger 20 the operator actuates an air valve admitting air under pressure into the operating cylinder of the device, thus causing air pressure to move the operating piston forwardly, moving the wire strand W through a predetermined distance and curling it in the pincer jaws around the parts to be connected. At the end of its operative stroke the actuating piston contacts and operates cut-off means which operate to cut off and to bend the trailing end of the ring laying it side by side with the leading end and as is shown in Fig. 8. Thereupon, the operator releases the grip 17 to open the jaws and removes the device from the upholstered structure, with the hog ring R remaining in place. The operation is repeated, with the wire being fed automatically, formed into a ring and cut off as explained above, all with ease and rapidity.

Figs. 1-11 show the device A in detail and illustrate the basic steps of the operation cycle taking place in the device. Referring specifically to said figures, the device illustrated therein comprises a cylinder 25 in which there is slideably fitted a fluid actuated piston 26 having a sealing collar 27 held in place by the member 28 secured through a threaded connection to the piston 26. The member 28 also serves as a spacer member ensuring that the port 29 always remains clear.

Figure 9:
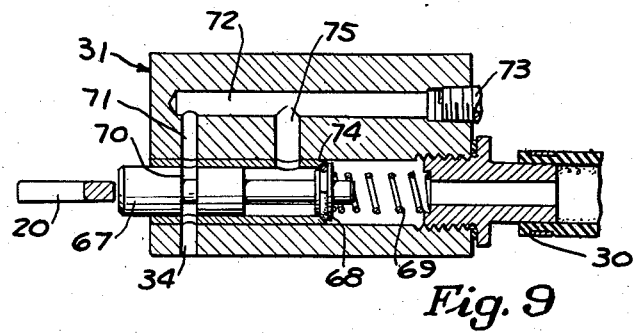
Fig. 9 is a sectional view taken in the direction of the arrows on the section plane passing through the section line 9—9 of Fig. 1.
Figure 10:
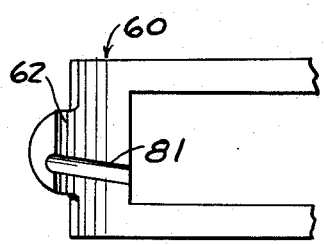
Fig. 10 is a view showing the die surface of the upper pincer jaw.
Figure 11:
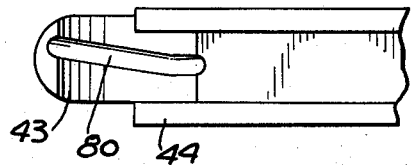
Fig. 11 is a plan view showing the die surface of the lower jaw.

In the present embodiment of the invention, the piston 26 is pneumatically actuated, i.e. is moved with the aid of compressed air supplied to the device through the hose H, the end 30 of which is connected to the device at the air valve mechanism. Admission of air under pressure into the cylinder 25 is controlled by a valve mechanism generally designated by the numeral 31, in a manner explained in detail further below. The fluid pressure actuates the piston 26 forwardly until the piston reaches the push rod 83, i.e. in its position indicated in light dotted line in Fig. 1 and designated by the numeral 26a. This part of the stroke of the piston 26 may be termed "curling movement," and it is designated in the drawings by the arrow with a letter a. The part of the stroke of the piston 26 from its position 26a to its position 26b may be termed "cutting off" movement, and it is designated in the drawings by the arrow with a letter b. Return movement of the piston 26 is effected by the compression spring 33 adapted to move the piston 26 rearwardly when the valve mechanism 31 establishes connection between the port 29 and exhaust port 34 as illustrated in Fig. 9. The rear end of the cylinder 25 is closed with the aid of a plug 35 to which there is connected a booster cylinder 36. A booster piston 37 is slideably fitted in the cylinder 36 and is adapted to transmit to the operating piston 26 forwardly directed force through a sleeve 38 passing through the cover 35 for the purposes explained further below. The rear end of the cylinder 36 is closed with the aid of a cover or plug 39.

Centrally of the cylinder 25 there is provided a tubular guide 40 through which a continuous strand of wire W is adapted to move in steps of a predetermined length, such length being equal to the length of the wire in one hog ring. The rear end of the guide 40 passes through the cover 39 as is best shown in Fig. 4, while its front end enters the front cover 41 which, in turn, is secured on the annular extension 42 secured in the front end of the cylinder 25 and closing the same in a manner best shown in Fig. 1. The extension 42 holds within itself the front end of the stop sleeve 32. The portion 40s of the guide 40 passing through the cylinders 25 and 36 is straight. However, the portion 40g of said guide 40 leading from the front end of the portion 40s to the pincer jaws is in the form of a goose neck as can be seen from Figs. 1 and 4 in order to bring the leading end of the wire W to the die surface 43 of the stationary pincer jaw 44 at a desired angle.

Means are provided whereby forward movements of the piston 26 through the portion 26a of its operative stroke cause movement of the wire W through the guide 40. In the embodiment of the present invention illustrated in the drawings, said means are exemplified by the jaws mechanism provided within the cylindrical hollow of the extension 26c of the piston 26. Said mechanism comprises a cylindrical member 50 hollowed out in its rear portion as indicated at 51 to house a compression spring 52. The front portion of the body of the member 50 is also hollowed out as indicated at 53. Within said hollow 53 there are carried three spring-pressed pawls 54, each having teeth 55 engaging the wire. A compression spring 56 provided for each pawl keeps the teeth 55 of the pawls in engagement with the wire W. The hinges 57 of the pawls are so situated that as the entire mechanism moves forwardly, the teeth 55 of the pawls tighten on the wire, gripping the same and push it forward through the guide 40. On the other hand, as the mechanism is carried rearwardly, the spring 56 is slightly compressed and the teeth 55 slide on the wire W. It is important to appreciate, however, that on the return movement of the mechanism, the teeth 55 of the pawls 54 will slide on the wire without carrying it rearwardly since slight friction of the teeth 55 over the wire surface caused by the action of the small spring 56 cannot overcome the resistance to rearward movement of the wire bent in the portion 40g. Neither would it possible to pull the wire from its rear end rearwardly of the device since, because of inclined arrangement of the pawls 54, the teeth 55 thereof would dig into the wire, causing limited rotation of the pawls 54 around their hinge joints 57. However, because of an inclined position of the pawls 54, such rotation would merely produce pressure transversely of the longitudinal axis of the device, resisted by the hinges 57.

Means are provided in my improved device to grasp the structure to be connected and to bring the leading end of the wire W into proper space relationship to the structure to be connected. Said means are exemplified by the stationary pincer jaws 44 and a movable pincer jaw 60 cooperating with said stationary pincer jaw 44. The movable pincer jaw 60 is in the form of a bell crank hinged, as indicated at 61, on the stationary structure of the device. The front end of the jaw 60 includes surface 62. The rear end of the movable jaw 60 is hingedly connected as indicated at 63 to a link 64 which, in turn, is hingedly connected to the grip 17, as indicated at 65. The grip 17 is maintained in its outer position as indicated in Fig. 1 with the aid of a compression spring 66.

As the operator, who holds the device by its revolver handle 18, presses the grip 17 with the fingers of his hand in opposition to the action of the spring 66, the above described connection of the jaw 60 and the grip 17 causes the pincer jaw 60 to close unto the stationary jaw 44 as shown in Fig. 4. Thereupon, the operator presses the trigger 20 which moves the plunger 67 inwardly. From an examination of Fig. 9 it will be appreciated that movement of the plunger 67 inwardly, i.e. to the right in Fig. 9, causes movement of the valve 68 also to the right in opposition to a compression spring 69. The plunger 67 is provided with a recess 70 which, in the forward position of said plunger, registers with the conduit 71, thus providing communication between the conduit 71 and the exhaust port 34, in consequence whereof the port 29 of the operating cylinder 25 communicates through the pipe 73 and conduit 72 with said exhaust port 34. However, as the plunger 67 moves inwardly, communication between the conduit 71 and the exhaust port 34 is interrupted, also interrupting communication between the port 29 of the operating cylinder 25 and the exhaust port 34. Since the valve 68 provided on the end of the plunger 67 will move with said plunger 67 to the right leaving its seat 74, air under pressure may pass from the hose 30 around the spring 69 and the valve 68, through the conduit 75 into the pipe 73. It should be noted that as shown in Fig. 9, there is provided sufficient clearance between the periphery of the valve 68 and the walls of the cylinder in which the the valve 68 moves. In consequence thereof, air under pressure from said hose 30 is directed through the port 29 into the operating cylinder 25. As the pressure is built up within the cylinder 25 behind the piston 26, said piston moves forwardly, causing the pawls 54 to pick the wire W and push it through the guide 40 into the pincer jaws 44.

The leading end of the wire W then enters the die channel 80 provided in the surface 43 of the lower pincer jaw 44 and follows the curvature thereof bending the wire. Since pushing of the wire continues, the leading end of the wire then enters the curved channel 81 provided in the surface 62 of the closed moveable jaw 60, continuing to bend the wire toward full circular shape. Because of the angularity of the channels 80 and 81 best shown in Figs. 10 and 11, bending of the wire proceeds along a helix, and when the bent or curled portion of the wire is cut off, it has the appearance best illustrated in Fig. 8 wherein the bent and separated portion, which may now be termed hog ring, is in the form of a ring in which the ends of the ring pass each other for a certain distance because of the helical nature of the ring.

When the piston 26 reaches its position indicated in thin dotted lines in Fig. 1 and designated therein by the character 26a, said piston contacts the rear end of a push rod 83, the front end of which is connected to a cutter 84. Movement of the piston 26 forwardly does not terminate at this point but on the contrary at this point of its travel a connection is established between the air under pressure and the booster cylinder 36 at the rear of the piston 37, through a conduit 38a, in consequence whereof the booster piston 37 exerts additional pressure through the sleeve 38 on the piston 26 causing the piston 26 to continue moving forward through the distance b, carrying with it the pusher rod 83 in opposition to its compressed spring 90. Such movement of the piston 26 and of the rod 83 causes said cutter 84 to cut off the wire W at 91 with its cutting edge 92 and to bend the wire over with its heel 93 into the form as illustrated in Fig. 6.

Means are provided to allow movement of the piston 26 while movement of the wire feeding means is prevented by the front cover 41 having been contacted by the front end of the member 50. Such means, which may be considered to be of the lost motion type, are exemplified by the recess 94 provided within the piston 26 providing for said piston 26 moving further forward, without carrying with it the member 50 and the pawls 54, for a distance determined by the distance between the rear end of the member 50 and the front surface of the member 28, which distance is indicated in the drawing by the arrow designated by the letter c. Because of the provision of such an expedient, when the front end of the member 50 reaches the cover 41 and the cutter 84 contacts the wire W, the wire W stops but the piston 26 continues moving forward sliding over the member 50, pushing the rod 83 and the cutter 84 to the end of their forward movement.

After the cutting operation is completed, which operation the operator feels in his hand and which is audible, the operator releases the grip 17 thus causing opening the jaws 44 and 60 and removing the device from the upholstered structure. However, the hog ring which encircles the connected parts of the upholstered structure and is bent thereon into permanent shape remains in place thereat as applied.

On the return movement of the piston 26, the spring 52 again expands piston 26 and the member 50, opening the gap of the distance c therebetween. After pressure of the piston 26 on the rod 83 ceases, said rod together with the cutter 84 is moved rearwardly by the spring 90. Thereupon, the operative parts of the device return into their respective positions illustrated in Fig. 1, and the device is now ready for application to another place on the upholstered structure and for repeating the cycle described above.

It will be understood that the size and shape of the pincer jaws may be varied to suit particular applications, and such jaws may be constructed to reach otherwise inaccessible places. If the size of the jaws is changed to provide for forming a larger hog ring, the stroke of the piston 26 is changed accordingly by changing the length of the stop sleeve 32. In some instances, the extension 42 may also be changed to protrude further forward. The stroke of the cutter 84 can also be varied, if desired, by changing the point at which the push rod 83 is contacted by the piston 26.

There is thus provided an improved device for simultaneous forming and applying upholstering hog rings whereby the objects of the present invention listed above and numerous additional advantages are attained.

I claim:

1. An apparatus for simultaneously forming and applying upholstery hog rings, said apparatus comprising a guide adapted to pass at least one continuous strand of wire, a fluid actuated piston, means actuated by said piston and adapted to grasp the wire and to move it forward through a definite distance, a spring adapted to return said piston and said means to their original positions, cooperating pincer jaws adapted to clasp the structure to be connected, said pincer jaws being connected to said guide to receive therefrom the wire as the same is moved through the guide, a forming die provided on the inner surface of one of said jaws and adapted to curl the end of said wire around said structure as the wire is moved forwardly, cutting means actuated by said piston through the end portion of the operative stroke of said piston for cutting off the curled portion of the wire, spring means adapted to return the cutting means to their original position as said piston moves toward its original position, and lost motion mechanism between said wire-moving means and said piston, said means operating to provide for movement of said piston for actuating the cutting means while the wire and said wire-moving means remain stationary.

2. A portable apparatus for simultaneously forming and applying hog rings, said apparatus including a cylinder with a fluid-operated piston slidably fitted therein, a guide conduit having a continuous strand of wire passed therethrough, a clasping die connected to said guide conduit and adapted to clasp the structure to be connected and to curl the end of the wire as it is moved into the die through said guide conduit, pawl means movable by said piston and adapted to engage said wire and move a length thereof into said die during the working stroke of the piston but to slide freely over said wire on the return stroke of the piston, cutting means actuated by said piston at the end of its working stroke to cut off the curled portion of the wire, and a booster cylinder with piston provided therein and operating on the fluid-operating piston and aiding the same in actuating the cutting means.

3. An apparatus for simultaneously forming and applying upholstering hog rings, said apparatus comprising a guide conduit having a continuous strand of wire passed therethrough, manually actuated pincer jaws adapted to clasp the upholstery structure to be connected, forming channel on said jaws, said channel adapted to receive the end of the strand of wire from said guide conduit and to curl it into a ring around the clasped upholstery structure as a length of wire is moved through said guide conduit, a fluid-operated member adapted to move said wire through said guide conduit in steps of said length, and cutting means operated by said fluid-operated member after said length of wire has been fed by it into said jaws and curled therein, to cut off the curled portion of the wire, said cutting means being also adapted to complete curling of the wire into a hog ring.

References Cited in the file of this patent

UNITED STATES PATENTS 2,421,474    Alter _____ June 3, 1947

FOREIGN PATENTS 333,033    Great Britain _____ Aug. 7, 1930